Patented June 27, 1950

2,512,640

UNITED STATES PATENT OFFICE 2,512,640

TREATMENT OF RAW PLANT TISSUE

Frank P. Greenspan and Paul H. Margulies, Buffalo, N. Y., assignors to Buffalo Electro-Chemical Company, Inc., Buffalo, N. Y., a corporation of New York No Drawing. Continuation of application Serial No. 696,053, September 10, 1946. This application July 25, 1949, Serial No. 106,741

6 Claims. (Cl. 99—154)

This invention relates to the treatment of raw plant tissue subject to impairment of quality, and more particularly to a method of inhibiting molding, fermentation or browning thereof or of restoring, to a substantial extent, the original color of already browned tissue.

This application is a continuation of our co-pending application Serial No. 696,053, now abandoned for Method of Preserving Raw Plant Tissue.

It is well known that most fruit and vegetables deteriorate in one manner or another, especially in an adverse environment such as exposure to air at ambient temperatures, and that the form and rate of such deterioration varies with the particular type of fruit or vegetables and the conditions to which they are subjected.

It is well recognized that the presence of micro-organisms has a bearing on quality and yields of fruit and vegetables intended for direct consumption or processing. For example, mold growth, causes large yield losses in various produce such as tomatoes, grapes and gives products of high mold count. Mold count is regarded as a quality index with standards set up for various products such as juices, jams, purees and sauces.

It is accordingly an object of this invention to provide a sterilizing wash for fruit or vegetables, such as tomatoes as harvested, which will control the bacterial and mold count in the product when such fruit or vegetables are processed thereby providing a product of improved quality.

Another object is to provide a sterilizing wash which materially reduces spoilage resulting from micro-organism growth such as mold and bacteria thereby decreasing raw material losses.

Another object is to provide a fungicidal and bactericidal treatment which prevents spoilage of the fruit or vegetables during those holding periods encountered in (1) transportation to distant markets or processing plants and (2) peak processing periods when raw material deliveries exceed plant production capacity.

The exposed surfaces of various raw fruit and vegetables, particularly when cut, turn brown or discolor in a relatively short time. This affects appearance, thereby decreasing the market value of the product. Such color changes are thought to be associated with oxidation catalyzed by enzymes present in the tissue of such fruit and vegetables. It is accordingly an important object of the present invention to provide a treatment for raw plant tissue which inactivates the enzymes responsible for browning and effectively inhibits such undesirable changes.

Another object is to provide a simple and effective treatment of already browned raw plant tissue which restores to a substantial extent the original natural color and simultaneously prevents subsequent browning thereof.

Another general object is to provide such a fungicidal, bactericidal, anti-browning or color restoration treatment which involves only the single step of applying a dilute solution in the form of a dip or spray to the produce, resulting in a simple low cost process applicable to the fruit or vegetables in baskets, hampers, etc. in the field or at the plant.

We have found that a surface wash or surface spray treatment of whole fruit or vegetables, such as tomatoes or grapes, with a small amount of a peracid of the fatty acid series in dilute aqueous solution, is highly effective as a fungicide in reducing the mold count in tomato and grape products made therefrom. We have further found that such a small amount of a peracid of the fatty acid series in dilute aqueous solution is highly effective as a bactericide, particularly when applied to cut or comminuted fruit or vegetables, in preserving the same and preventing spoilage. We have further found that the treatment of the exposed surfaces of raw fruit and vegetables, especially when cut, with such a small amount of a peracid of the fatty acid series in dilute aqueous solution results in inactivation of the enzymes responsible for the discoloration known as browning. Additionally we have found that, where such browning has already taken place, the treatment of the raw fruit or vegetables with the fatty peracid results in a substantial restoration of the browned fruit or vegetables to the original colors thereof. Where such restoration of the color of browned fruit or vegetables has taken place, subsequent browning of the raw fruit or vegetables is effectively retarded.

Such treatment with the peracids of the fatty acid series is carried out preferably at room temperatures and the application of the peracid of the fatty acid series can be effected by immersion, spraying or in any other suitable way. The concentration of the aqueous solution of the peracid of the fatty acid series can be very dilute but should not be less than 0.05% of the peracid.

The organic peracids constitute a class of acids which are chemically characterized by the presence of the perhydroxyl group OOH as part of the molecule. They may be regarded as derived from other acids by replacing the hydroxyl group containing the ionizable hydrogen atom of said acids by the perhydroxyl group OOH. Thus, peracetic acid has the chemical constitution

CH₃.COOOH and may generally be regarded as derived from acetic acid

CH₃.COOH by replacing a hydroxyl group with the perhydroxyl group.

In aqueous solution the organic peracids and the salts of these peracids, particularly their alkali forming salts, are full equivalents of each other. As far as the utility of the solution in the present application is concerned, it makes little difference whether the peracid radical is part of the acid or the salt of the acid. In any given solution the relative amounts of organic peracid and salt of the peracid depend generally upon the pH of the solution. In view of this, the term "peracid" will be used in this specification and in the appended claims generally to include not only the acids themselves but their salts, particularly the alkali forming salts.

The plant tissue can be treated with a solution containing a single peracid of the fatty acid series, as in the following examples, or a mixture of two or more such peracids. The term "peracid" as used in the accompanying claims is therefore intended to include not only a single peracid but also a mixture of peracids of the fatty acid series.

EXAMPLE I.—GERMICIDAL AND FUNGICIDAL ACTION OF PERACETIC ACID

Modified phenol coefficient tests were made to ascertain the germicidal and fungicidal activity of peracetic acid. The results obtained with various micro-organisms are set forth in Table I. The top figure in each space of this table represents the concentration of the peracetic acid expressed in percent capable of killing the respective organisms in ten minutes but not in five minutes. The middle figure is the molarity of the percentage above it and the bottom figure is the corresponding amount of active oxygen for the peracetic acid.

TABLE I

*The killing concentrations of peracetic acid at neutrality in phosphate buffer and in nutrient broth*

| Organism | Peracetic Acid | |
|---|---|---|
| | Phosphate Buffer | Nutrient Broth |
| E. coli  | 0.001%<br>0.00013 M<br>0.00021% AO | 0.02%<br>0.0027 M<br>0.004% AO |
| S. aureus | 0.001%<br>0.00013 M<br>0.00021% AO | 0.02%<br>0.0027 M<br>0.004% AO |
| P. Aeruginosa  | 0.005%<br>0.0007 M<br>0.001% AO | 0.025%<br>0.0034 M<br>0.005% AO |
| B. subtilis | 0.3%<br>0.039 M<br>0.06% AO | 0.5%<br>0.065 M<br>0.1% AO |
| A. Niger | 0.005%<br>0.0007 M<br>0.001% AO | 0.05%<br>0.007 M<br>0.01% AO |
| P. roqueforti | 0.005%<br>0.0007 M<br>0.001% AO | 0.05%<br>0.007 M<br>0.01% AO |

EXAMPLE II.—MOLD GROWTH ON WHOLE TOMATOES

To indicate the effect of peracetic acid in lowering the micro-organism count of fruit and vegetables, experiments were conducted in a commercial cannery on whole ripe tomatoes to be converted into tomato juice and tomato ketchup. The quality of the tomato products was determined by mold counts as per Official Methods of Analysis of the Association of Official Agricultural Chemists, 6th edition, p. 788. These mold counts were made following the conversion in conventional manner of whole tomatoes into tomato juice and tomato ketchup, respectively. Each test batch comprised 15 half-bushel baskets of ripe whole tomatoes taken indiscriminately from the same lot and to eliminate subjectivities no bad portions of any of the tomatoes were cut away. In one of the following comparative tests (Table II), one batch of tomatoes was kept as a dry blank, another batch was water washed while in the basket and a third batch sprayed with a 0.3% aqueous solution of peracetic acid. Mold counts were made on the juice and ketchup of one batch processed immediately on receipt from the field to provide a reference point; and on batches held 24 hours after the indicated treatment and before processing. In the second set of experiments (Table III) mold counts were made on juice and ketchup from batches processed at the end of 24, 48, and 72 hours after having been given the treatment indicated. The mold counts found are as set forth in the following tables:

TABLE II

*Mold counts on tomato products*

| Time of holding prior to processing | | Dry Blank | Water Washed | Sprayed with 0.3% Peracetic Acid Solution |
|---|---|---|---|---|
| 0 hours | juice | ¹16 | | |
| | ketchup | 28 | | |
| 24 hours | juice | 28 | 42 | 14 |
| | ketchup | 42 | 50 | 30 |

¹ Represents reference point, being mold counts on juice and ketchup made from part of the tomatoes used in these tests and which part was processed immediately on receipt from the field.

TABLE III

*Mold counts on tomato products*

| Time of holding prior to processing | | Dry Blank | Sprayed with 0.3% Peracetic Acid Solution |
|---|---|---|---|
| 0 hours | juice | ¹23 | |
| | ketchup | 32 | |
| 24 hours | juice | 49 | 24 |
| | ketchup | 65 | 40 |
| 48 hours | juice | 60 | 25 |
| | ketchup | 85 | 43 |
| 72 hours | juice | 85 | 48 |
| | ketchup | 94 | 60 |

¹ Represents reference point, being mold counts on juice and ketchup made from part of the tomatoes used in these tests and which part was processed immediately on receipt from the field.

EXAMPLE III.—MOLD GROWTH ON WHOLE GRAPES

Particularly in warm weather it is commercially important to inhibit mold growth on grapes from the field held for processing at the cannery. As with tomato products such as ketchup and tomato juice, mold count standards have been set up for grape jams and grape preserves.

Ten 26 pound boxes of Niagara grapes were selected from a single lot which came from one field. The grapes were one day old when received.

On receipt of the grapes, two boxes were immediately made into juice and samples of the juice were sterilized for later examination. This was the batch used as the "zero time" control. Four boxes of the grapes were set aside untreated. The remaining four boxes were dipped for one minute in an aqueous solution containing 0.3% peracetic acid (100%), and 0.1% of an alkyl aryl sulfonate as a wetting agent and then also set aside.

The four untreated and the four treated boxes were held at a temperature of from 65° to 75° F. for three days and were then juiced, the juice from all boxes in each lot being blended without filtering and samples canned in pint jars and sterilized by heating for 30 minutes in boiling water. Mold counts on this juice were then run according to standard methods employed by the grape industry. The results of these mold counts on the juice from three cans of the "zero time" control lot, three cans of the lot held for 3 days without treatment, and three cans of the lot held for 3 days after the treatment in 0.3% peracetic acid were as follows:

TABLE IV

Mold count on grape juice

| Time of holding and treatment | Can 1 | Can 2 | Can 3 |
|---|---|---|---|
| 0 hours | 4 | 4 | 4 |
| 3 days—untreated | 16 | 20 | 24 |
| 3 days—dip in 0.3% peracetic acid | 4 | 4 | 4 |

It was noted that the lot of grapes so held for 3 days after the treatment in 0.3% peracetic acid were of considerably better appearance than the grapes of the lot held for 3 days without treatment and that there was less visible mold and a less slimy feel. The results outlined in Table IV further show that during a three day storage a single treatment of grapes with peracetic acid held the mold static while an untreated lot held under similar conditions more than quadrupled its mold count.

EXAMPLE IV.—PEROXIDASE ENZYME INACTIVATION

Browning is acknowledged to be an oxidation for which the peroxidase enzyme is responsible. The following experiment demonstrates the ability of peracetic acid to inactivate peroxidase. Peroxidase was tested for by adding 1 ml. of 1% guaiacol followed by 1 ml. of 0.5% hydrogen peroxide to 5 ml. of the fresh pea slurry used in the experiment. The presence of the peroxidase was indicated by a deep brown-black color after a few minutes.

FRESH PEAS

A slurry was made from 100 g. fresh peas and 100 g. water and to some of this fresh pea slurry was added a 45% peracetic acid stock solution to provide a final concentration of 0.3% peracetic acid. As a result at the end of 1 hour the treated slurry gave a negative peroxidase test indicating complete inactivation of the peroxidase enzyme.

EXAMPLE V.—BROWNING OF FRUIT AND VEGETABLES

I. POTATOES

Raw white potatoes were cut, ground and pulped to provide a potato slurry and used for the following experiments:

A. Blank

A batch of this potato slurry, untreated, was used as a blank test and permitted to stand. Within a few hours this untreated batch had darkened considerably to the point of being brown-black in appearance. This untreated batch also had developed a strong odor normally associated with fermentation.

B. 0.5% peracetic acid

To a batch of this potato slurry was added peracetic acid stock solution as previously described to provide a final concentration of 0.5% peracetic acid. After several hours the potato slurry so treated remained white, no browning and no fermentation occurring. Two weeks later the batch presented an unchanged appearance.

C. 0.5% performic acid

To a batch of slightly browned raw potato slurry was added an aqueous solution of performic acid to effect a final concentration of 0.5% performic acid. Immediate whitening of the potato slurry took place and the slurry still remained white after a period of three days. During this period no fermentation took place.

D. 0.1% peracetic acid

It was found that concentrations of peracetic acid lower than 0.5% were also effective. Thus, with the treatment of a batch of raw potato slurry with peracetic acid solution to effect a final concentration of 0.1% peracetic acid, after three days the batch did not show darkening or fermentation, whereas an untreated test blank permitted to stand under the same conditions became brown-black and had fermented.

E. 0.3% percapric acid

To a batch of slightly browned raw potato slurry was added an aqueous solution of percapric acid to effect a final concentration of 0.3% percapric acid. The browning of the potato slurry appeared to stop immediately upon the addition of the percapric acid solution and upon observation three days later no further browning had taken place and no fermentation was observable.

Another batch of this slightly browned raw potato slurry, untreated, was used as a blank test and permitted to stand under the same conditions as the above treated batch. After standing several hours the untreated batch was darker, and after three days was dark brown in color and had a strong odor.

II. JERUSALEM ARTICHOKES

A. Blank

Raw Jerusalem artichokes were ground and then pulped in a blending machine, the material commencing to darken almost immediately. Cut surfaces of Jerusalem artichokes discolor very rapidly on exposure to air. 50 g. of the artichoke slurry were placed in a bottle and stored in the dark. Progressive darkening took place, the color becoming brown-black within a very short time. A hay-like odor developed and increased with time.

B. 0.5% peracetic acid

To 50 g. of the same artichoke slurry already considerably browned, a peracetic acid stock solution was added so that the final concentration was 0.5% peracetic acid. As a result there was an immediate lightening of the color of the slurry to a pale tan with no further darkening.

III. PEACHES

A. Fresh peaches

Hale Haven peaches were peeled and segmented. One half of these peaches were immersed in a 0.5% peracetic acid solution for five minutes. The other half were immersed in water for use as a blank control. All of the peaches were drained, water washed, packed in jars and stored away at room temperature. The results are set forth in the following Table V.

TABLE V

Browning of fresh peaches

| Treatment | One Day | One Week |
|---|---|---|
| Blank Control | dark brown | brown black. |
| 0.5% peracetic acid | yellow | yellow. |

B. Frozen peaches

Hale Haven peaches were blanched 1 minute chilled, peeled, pitted and sliced. Following this they were divided into four batches and each batch treated as set forth in the following Table VI. Following this each batch was packed in a 50% sugar solution in a frozen pack container. The peaches were then stored at low temperature in a freezer and examined after 11 months. Prior to examination, the peaches were allowed to thaw for 22 hours in the closed containers.

TABLE VI

Browning of frozen peaches

| Treatment | Time of Dip | Color after 11 Months' Storage |
|---|---|---|
| | Minutes | |
| Blank Control | | dark brown. |
| 0.5% peracetic acid solution | 3 | yellow. |
| 0.5% peracetic acid in 50% sugar solution | 3 | Do. |
| Do | 5 | Do. |

It will be apparent that many changes can be made in the process as described in the above examples which will nevertheless fall within the scope of this invention. Accordingly, it is our intention that the invention is not restricted to the various details, conditions, amounts and procedures given as typical and illustrative of preferred procedure except as necessitated by the prior art and appended claims.

We claim:
1. The method of preserving raw plant tissue subject to deterioration, which comprises treating the exposed surfaces thereof with a peracid of the fatty acid series.
2. The method of inhibiting the browning, molding or fermentation of raw plant tissue subject to such deterioration or of restoring to a substantial extent the color of such plant tissues which have already browned, which comprises treating the exposed surfaces thereof with not less than 0.05% of a peracid of the fatty acid series.
3. The method of inhibiting the browning, molding or fermentation of raw plant tissue subject to such deterioration or of restoring to a substantial extent the color of such plant tissues which have already browned, which comprises treating the exposed surfaces thereof with peracetic acid.
4. The method of lowering the micro-organism count of fruit or vegetables, which comprises applying to the exposed surfaces thereof a peracid of the fatty acid series.
5. The method of decreasing the spoilage of fruit or vegetables, which comprises treating the exposed surfaces thereof with not less than 0.05% of a peracid of the fatty acid series.
6. In the handling of fruit or vegetables, the improvement comprising washing the fruit or vegetables with an aqueous solution of peracetic acid.

FRANK P. GREENSPAN.
PAUL H. MARGULIES.

REFERENCES CITED

The following references are of record in the file of this patent:

UNITED STATES PATENTS

| Number | Name | Date |
|---|---|---|
| 1,108,521 | Scheuermann | Aug. 25, 1914 |
| 1,166,588 | Hoffman | Jan. 4, 1916 |
| 2,011,465 | Balls et al. | Aug. 13, 1935 |
| 2,028,970 | Ewell | Jan. 28, 1936 |
| 2,298,933 | Elion | Oct. 13, 1942 |
| 2,353,333 | Harris | July 11, 1944 |

FOREIGN PATENTS

| Number | Country | Date |
|---|---|---|
| 3,035 | Great Britain | of 1880 |